(12) United States Patent
Borracci

(10) Patent No.: US 7,992,789 B2
(45) Date of Patent: Aug. 9, 2011

(54) METHOD FOR MAKING A SECURE PERSONAL CARD AND ITS WORKING PROCESS

(75) Inventor: Fabrizio Borracci, Udine (IT)

(73) Assignees: Fabrizio Borracci (IT); Matteo Amoroso (IT)

( * ) Notice: Subject to any disclaimer, the term of this patent is extended or adjusted under 35 U.S.C. 154(b) by 0 days.

(21) Appl. No.: 12/239,128

(22) Filed: Sep. 26, 2008

(65) Prior Publication Data

US 2009/0084858 A1    Apr. 2, 2009

Related U.S. Application Data

(63) Continuation of application No. PCT/EP2007/002083, filed on Mar. 9, 2007.

(30) Foreign Application Priority Data

Mar. 27, 2006 (IT) ............... UD2006A0075
Mar. 1, 2007 (IT) ............... UD2007A0046

(51) Int. Cl.
G06K 19/05 (2006.01)
(52) U.S. Cl. ....................... 235/482; 235/487
(58) Field of Classification Search .......... 235/492, 235/486, 487, 451
See application file for complete search history.

(56) References Cited

U.S. PATENT DOCUMENTS

| 6,959,874 B2 * | 11/2005 | Bardwell ............ 235/493 |
| 6,997,381 B2 * | 2/2006 | Arnouse ............ 235/382 |
| 7,424,134 B2 * | 9/2008 | Chou ............ 382/115 |
| 7,433,848 B1 * | 10/2008 | Albrecht et al. ............ 705/73 |
| 2003/0019942 A1 | 1/2003 | Blossom |
| 2004/0129787 A1 | 7/2004 | Saito et al. |
| 2004/0203352 A1 | 10/2004 | Hall et al. |
| 2005/0178827 A1 | 8/2005 | Shatford |
| 2005/0212657 A1 | 9/2005 | Simon |
| 2006/0000899 A1 | 1/2006 | Bonalle et al. |

(Continued)

FOREIGN PATENT DOCUMENTS

EP    0813164 A1    12/1997

(Continued)

OTHER PUBLICATIONS

International Search Report, PCT/EP2007/002083, Jul. 12, 2007, 5 Pages.

(Continued)

*Primary Examiner* — Daniel St.Cyr
(74) *Attorney, Agent, or Firm* — St. Onge Steward Johnston & Reens LLC

(57) ABSTRACT

A method for producing a secure personal card and its working process using an intelligent card, the card has electric contacts, a CPU with at least data memory of the user and a biometric data receptor of the user. The biometric data stored in the card is used to make a comparison with biometric data received at the moment of use. Once the card is activated, generating an absolute identification of the biometric data of the authorized user, said biometric data being stored in an unreadable memory, generating and storing the personal data of the user and his/her access code, said biometric data being compared with the current read data of the actual user, in order to verify the identity of the user, then verification and identification of said personal data and access code being allowed in order to continue regular working operation.

20 Claims, 1 Drawing Sheet

U.S. PATENT DOCUMENTS

2006/0131393 A1  6/2006 Cok et al.
2007/0223179 A1* 9/2007 Cheng et al. ................ 361/600

FOREIGN PATENT DOCUMENTS

| EP | 1326196 A1 | 7/2003 |
|---|---|---|
| GB | 2407189 A | 4/2005 |
| WO | 2005096214 A1 | 10/2005 |
| WO | 2007022423 A2 | 2/2007 |

OTHER PUBLICATIONS

Notification of Transmittal of the International Preliminary Report on Patentability, Jun. 3, 2008, 12 Pages.

* cited by examiner

METHOD FOR MAKING A SECURE PERSONAL CARD AND ITS WORKING PROCESS

CROSS-REFERENCE TO RELATED APPLICATIONS

The present application is a continuation of International patent application PCT/EP2007/002083 filed on Mar. 9, 2007 which designates the United States and claims priority from Italian patent applications UD2006A000075 filed on Mar. 27, 2006 and UD2007A000046 filed on Mar. 1, 2007, the content of which is incorporated herein by reference.

FIELD OF THE INVENTION

This invention relates to a method for producing a secure personal card and its working process, whose characteristics correspond to the pre-characterising part of the main claim. The smart card provided with such a process is also an object of the present invention.

The field of application is substantially aimed at the electronic service of data processing, at the telecommunications sector and at all sectors related to electronic smart-card manufacturing.

In this description and claims the term Smart Card is understood in a widely interpretative sense, namely for example: credit/debit cards, electronic-money card, personal-digital-signature card, control and authorisations of network accesses card, financial services card, client authentication card, client identification card, identity certification card, identification in accessing network services card, substitute card in password management, etc.

BACKGROUND OF THE INVENTION

At present, intelligent cards or Smart-Cards or microchip cards are known and are in use that are capable of performing a very large number of functions, both for identification as well as for payments and collections, or for a plurality of other services.

The most advanced smart cards contain a microprocessor or chip to control and identify the user name and its code in order to allow various functions. Identification data and a respective password are stored in the smart card in order to allow the verification of whether the user is a genuine user, otherwise the smart card cannot be used.

New smart cards are conceived in new technology marketing, namely the insertion into the smart card also of a biometric feature(s) of the user, e.g. thumb reader.

PRIOR ART EXAMPLES

US2003/019942 A1 "BLOSSOM GEORGE W.", that discloses a system and method for an electronically readable card having a power source.
US2004/203352 A1 "HALL ERIC S ET ALL", that discloses a system and method for wireless data transfer for a mobile unit.
GB2407189 A "VODAFONE GROUP PLC", that discloses system and method for preventing unauthorised access to a smart card without contact using a biometric system, e.g. touch of the fingerprint on the card.
EP1326196 A "NAGNEK CORPORATION", that discloses a smart card sensitive to fingerprints with on-card fingerprint comparison, in which a fingerprint reader is placed on the smart card in a single position that is capable of reading the whole fingerprint image applied on it by the user (touch of the fingerprint on the card).
US2006/0131393 that discloses a multi-function transaction card.
US2004/129787 comprising main features of pre-characterising part of claim 1 further pertinent prior art being US2005/178827, US2005/212657, WO2005096214.

Notwithstanding the addition of further biometric feature(s) of the user, a smart card can still be counterfeited for use by an unauthorised user.

SUMMARY OF THE INVENTION

The scope of the invention is to resolve the aforementioned problems and drawbacks and to provide an intelligent card capable of more secure use.

The problem is resolved with the characteristics of the main claim. The sub-claims represent advantageous preferred solutions that provide improved performance.

In this way, it is possible to have a truly very secure smart card to use in any card service in which a very secure identification is required.

BRIEF DESCRIPTION OF THE DRAWINGS

For a better understanding, the invention is described in a preferred solution with the aid of the annexed figures.

DETAILED DESCRIPTION OF THE INVENTION

Figure 1:
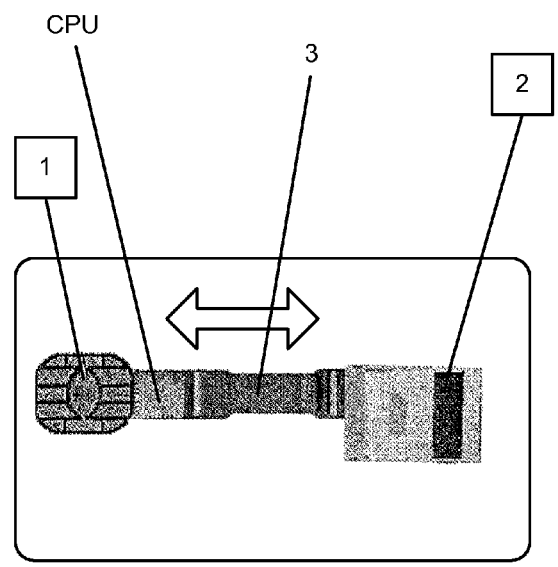
FIG. 1 and FIG. 2 represent the plan view and lateral view of the card.
Figure 2:
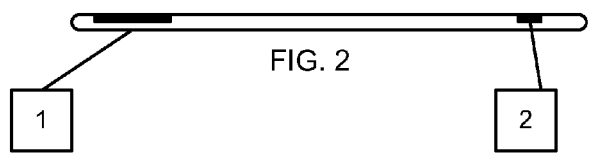

The card is substantially a smart card having a smart card connector by means of a connector (1), connected to the CPU by a data bus, VCC and CLK embedded in the moulding of the card that is covered in plastic material.

The CPU is in turn connected by means of an internal bus to a fingerprint reader scan-detector by means of a biometric sensor (2) with a relative memory processor.

Said internal bus is connected to an integrated memory that includes RAM, ROM and EPROM.

In more detail the numerical references indicate:
1) CONTACTS connected to the CPU. Contacts are made according to the ISO standard: they have input supply, a clock and semi-duplex serial communication.
2) BIOMETRIC SENSOR: The biometric sensor is a fingerprint scan-detector sensor. In this way, a secure identification is allowed avoiding the problems of the exact positioning of the finger on the reading position. The processors and the memories are manufactured in packages by direct moulding with plastic material and therefore without casing.
3) INTERNAL BUS: The internal BUS is a main connection between the CPU and the biometric sensor (2) to allow:
   a) at the start and once only activation of the personal card:
   i. generation of the absolute identification of the biometric data of the authorized user is carried out, said biometric data being stored in readable memory only internally on said card thus making it absolutely impossible to read or detect or perceive outside said card, and
   ii. generation and storing of personal data of the user and his/her access code;

b) on the following reuse:
   i. said biometric data being compared only internally inside said card with the current biometric re-reading of the actual user, to check if the present re-reading corresponds exactly with that stored previously, said check being made only internally in the smart card in comparison with the previously inaccessible and unreadable biometric data memory, and then
   ii. verification and identification of said personal data and access code being allowed in order to continue regular working operation.

In this way it is absolutely impossible to counterfeit said smart card or to counterfeit any action of use with said smart card, since the unauthorised user:
   a) not only does not have the respective access data and password, but
   b) it is impossible to build or rebuild new biometric identification data, said biometric identification data being not renewable.

Furthermore, all privacy of the personal biometric data in this way is not stored outside on external servers, avoiding the danger that other unauthorised users could use said data for counterfeiting.

Advantageously, with the aim of making the card even more secure, in order to avoid damaging the processor (CPU) and respective biometric data memory, the respective memory and silicon wafer and/or microprocessor and electrical connections are coated with epoxy resin.

Casing:

The voltage supply is within the range of approximately 4.75-5.25 V. The maximum current is preferably within the range of approximately 200 mA. The card is optionally equipped with a magnetic data strip and with an RFID transponder.

In this way a very secure and light card is obtained with a very thin section (0.54 mm) that can to be kept in a wallet like all traditional magnetic cards.

Personal Biometric Data

In the preferred solution a finger print scanner (2) is used, in which the scanning movement is made by a finger transversely on the rectangular window of the scanner enclosed on the same card on the same side and in the opposite position to said contacts (1).

In this way a notable advantage is obtained since the card is activated and powered by said contacts and only when it is inserted.

Only at this time is it possible to scan the finger of the user on the remaining external portion of the card in which said finger-scanner window is available.

Scanning is carried out by sliding the finger longitudinally in the internal to external direction.

Said type of working is only possible when said card is inserted into an authorised apparatus for its use.

Figure 3:
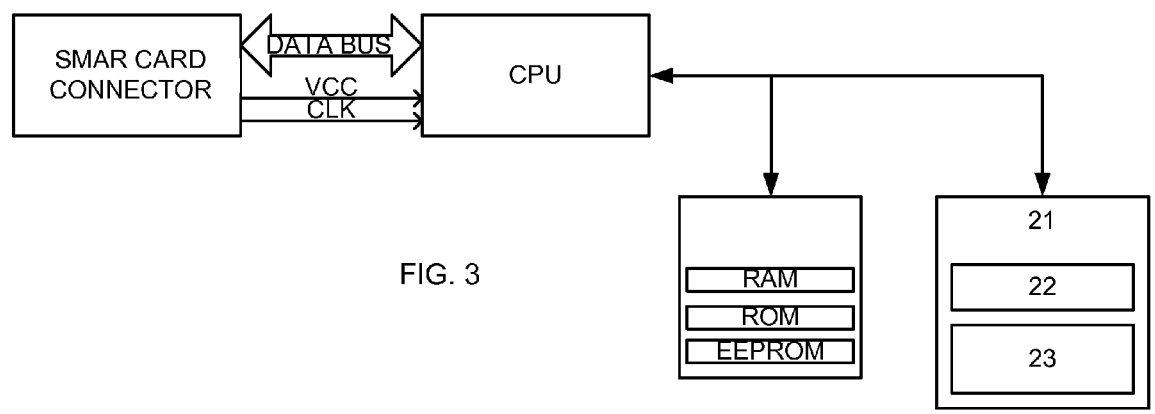
FIG. 3 represents the block schematic view of the main components of the said card.

It is clear from FIG. 3 that the personal card includes general Memory data+RAM+ROM and EPPROM.

The incorporation of the digital fingerprint scanner 2 that includes digital fingerprint elaboration means (21) associated to sensor means (22) and a memory processor (23) is also clear from FIG. 3.

Advantageously, said method uses two microprocessors:
a first microprocessor on one side below said electric contacts (1) for the management of the card and
a second microprocessor for the analysis of said biometric data on the diametrically opposite side (23), both being connected by a bus (3) made of flexible material.

In this way, there is the advantage of having a very secure and very powerful card that is also equally thin and flexible for the two microprocessors on opposite sides.

Also advantageously, said biometric data receptor (2) comprises means for DNA analysis.

In this way, it is possible to obtain a much more secure card when in terms of comparison the DNA analysis is implemented, that in combination with the other parameters makes it practically impossible to counterfeit by means of the combination of the characteristics.

Advantageously said biometric data receptor (2) comprises microprocessor means able to compare said DNA identification data with respective finger-print data for both identity check before allowing further working. In this way the most sure identification of the authorized user is assured.

Obviously the general expression "finger print" must be intended in this context a sliding contact finger surface, that produces by its movement substantially a scanning that produces a finger-print data.

Advantageously said smart card is endowed with an inside battery for autonomous working. In this way, e.g. the scanning of the sliding contact finger surface can be made just before inserting the card in a machine reader for its working, so not needing power connection before scanning the sliding contact finger surface.

What is claimed is:
1. A secure personal card comprising:
   a card;
   said card having a first side and a second side, said second side being opposite said first side;
   a first microprocessor that manages said card, said processor being located below electrical contacts on said first side;
   a fingerprint scanner for obtaining biometric data of said user including:
      a fingerprint sensor; and
      a second microprocessor that analyzes said biometric data of said user;
   wherein said fingerprint scanner is located on said second side;
   a biometric data memory, unreadable from an external source for storing said biometric data of said user;
   a flexible bus located on said card connecting said first microprocessor and said second microprocessor;
   wherein said fingerprint scanner scans a first biometric data set of an initial user and stores said first biometric data set on said biometric data memory; and
   wherein said second microprocessor analyzes a second biometric data set of a second user and compares said second biometric data to said first biometric data stored in said biometric data memory to verify the authenticity of said second user;
   wherein said card can only be operated when said second biometric data set matches said first biometric data set.

2. The secure personal card of claim 1, wherein said electrical contacts are connected to said first microprocessor by a DATA BUS, VCC, and CLK.

3. The secure personal card of claim 2, wherein said flexible bus comprises a RAM, ROM, and EPROM memory connection.

4. The secure personal card of claim 2, wherein said card includes one of at least a magnetic memory strip, an RFID transponder, and a battery.

5. The secure personal card of claim 2, wherein said biometric data receptor is one of at least a fingerprint scanner and a DNA analyzer.

6. The secure personal card of claim 5, wherein said microprocessor compares DNA from said DNA analyzer jointly with a fingerprint from said fingerprint scanner.

7. The secure personal card of claim 1, wherein said flexible bus comprises a RAM, ROM, and EPROM memory connection.

8. The secure personal card of claim 1, wherein said card is not stratified and wherein said devices are embedded in said card by means of thermo-fusion moulding.

9. The secure personal card of claim 1, wherein said first microprocessor, said second microprocessor, and said memory is pre-coated with epoxy resin fusion film.

10. The secure personal card of claim 1, wherein said biometric data receptor includes one of at least a fingerprint scanner and a DNA Analyzer.

11. A method for operating a secure personal card comprising the steps of:
 obtaining biometric data of an initial user from a fingerprint scanner during a first use of the card by an authorized user;
 storing the biometric data of the authorized user in a biometric data memory located only on the card;
 storing personal data corresponding to the authorized user on the card;
 generating and storing an access code corresponding to the authorized user on the card;
 obtaining biometric data from a subsequent user during a subsequent use of the card;
 comparing the biometric data of the subsequent user to the biometric data stored in the biometric data memory;
 wherein the card can only be operated when the biometric data of the subsequent user matches the biometric data of the first user; and
 wherein the card further comprises:
 a first microprocessor below electrical contacts on a first side of the card;
 the fingerprint scanner for obtaining biometric data of said user including:
  a fingerprint sensor; and
  a second microprocessor that analyzes the biometric data of the user;
 wherein the fingerprint scanner is located on the second side opposite the first side;
 a flexible bus located on the card connecting the first microprocessor and the second microprocessor.

12. The method of claim 11, wherein the first microprocessor is a CPU processor and the second microprocessor is a circuit processor.

13. The method of claim 12, wherein said biometric data receptor comprises one of at least a fingerprint scanner and a DNA analyzer.

14. The method of claim 13, wherein said biometric data receptor comprises a microprocessor to compare DNA from said DNA analysis jointly with a fingerprint from said fingerprint scanner.

15. The method of claim 12, wherein the electrical contacts are connected to said CPU processor by a DATA BUS, VCC, and CLK.

16. The method of claim 15 wherein said flexible bus comprises a RAM, ROM, and EPROM memory connection.

17. The method of claim 15, wherein said card is not stratified and wherein said internal devices are embedded by means of thermo-fusion moulding.

18. The method of claim 15, wherein said CPU microprocessor and said memory is pre-coated with epoxy resin fusion film.

19. The method of claim 15, wherein said secure personal card comprises one of at least a magnetic memory strip, an RFID transponder, and a battery.

20. The method of claim 15, wherein said contacts have one of at least an input supply, a clock, and a semi-duplex serial communicator.

* * * * *